United States Patent [19]

Uhlemann et al.

[11] Patent Number: 5,480,617

[45] Date of Patent: Jan. 2, 1996

[54] APPARATUS FOR CONTINUOUS FLUIDIZED BED AGGLOMERATION

[75] Inventors: Hans Uhlemann, Solingen; Josef Schmoll, Goslar; Manfred Bücheler, Overath, all of Germany

[73] Assignee: Bayer Aktiengesellschaft, Leverkusen, Germany

[21] Appl. No.: 193,836

[22] Filed: Feb. 8, 1994

[30] Foreign Application Priority Data

Feb. 15, 1993 [DE] Germany .......................... 43 04 405.0

[51] Int. Cl.⁶ .................................. B01J 2/02; B01J 8/22
[52] U.S. Cl. ...................... 422/140; 422/143; 422/145; 422/147; 34/582; 34/585; 34/588; 118/DIG. 5
[58] Field of Search ........................ 422/140, 143, 422/311, 145, 147; 34/359, 364, 369, 371, 579, 582, 583, 585, 588, 593; 118/DIG. 5

[56] References Cited

U.S. PATENT DOCUMENTS

| | | | |
|---|---|---|---|
| 4,372,228 | 2/1983 | Korenberg | 34/585 |
| 4,931,174 | 6/1990 | Uhlemann et al. | 209/139.1 |
| 4,946,654 | 8/1990 | Uhlemann et al. | 422/140 |
| 5,213,820 | 5/1993 | Uhlemann et al. | 425/222 |

FOREIGN PATENT DOCUMENTS

| | | | |
|---|---|---|---|
| 0122112 | 10/1984 | European Pat. Off. | B01F 5/20 |
| 0163836 | 12/1985 | European Pat. Off. | B01J 2/16 |
| 0332929 | 9/1989 | European Pat. Off. | B01J 2/16 |
| 3323418 | 1/1985 | Germany | B05C 19/02 |
| 229608 | 11/1985 | Germany | B01J 2/16 |
| 3517309 | 11/1986 | Germany | B03B 4/00 |
| 3530744 | 3/1987 | Germany | B01J 8/27 |
| 3609133 | 9/1987 | Germany | B01J 2/16 |
| 3716968 | 12/1988 | Germany | B01J 2/16 |
| 3808116 | 9/1989 | Germany | B07B 4/04 |
| 4120694 | 2/1992 | Germany | B01J 2/16 |
| 584567 | 2/1977 | Switzerland | B01J 2/16 |

*Primary Examiner*—Robert J. Warden
*Assistant Examiner*—Hien Tran
*Attorney, Agent, or Firm*—William C. Gerstenzang; Sprung Horn Kramer & Woods

[57] ABSTRACT

Process for the continuous fluidized bed agglomeration wherein the granulating liquid together with propellant air is supplied centrally through a three-phase nozzle on the distributor of the fluidized bed, and at the same time, the solid in powder form is fed into the fluidized bed through the annular space or the three-phase nozzle with the air of a current of propellant air, supplied separately and concentrically.

3 Claims, 3 Drawing Sheets

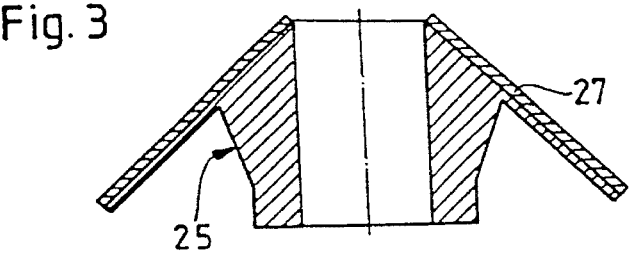
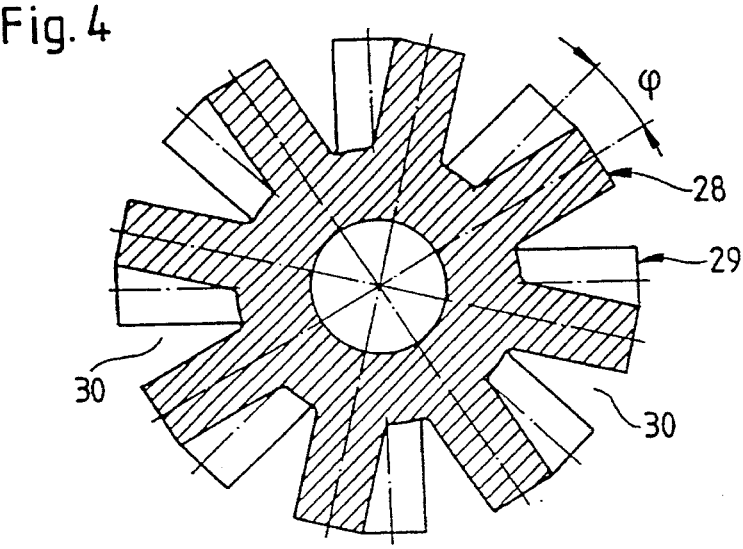
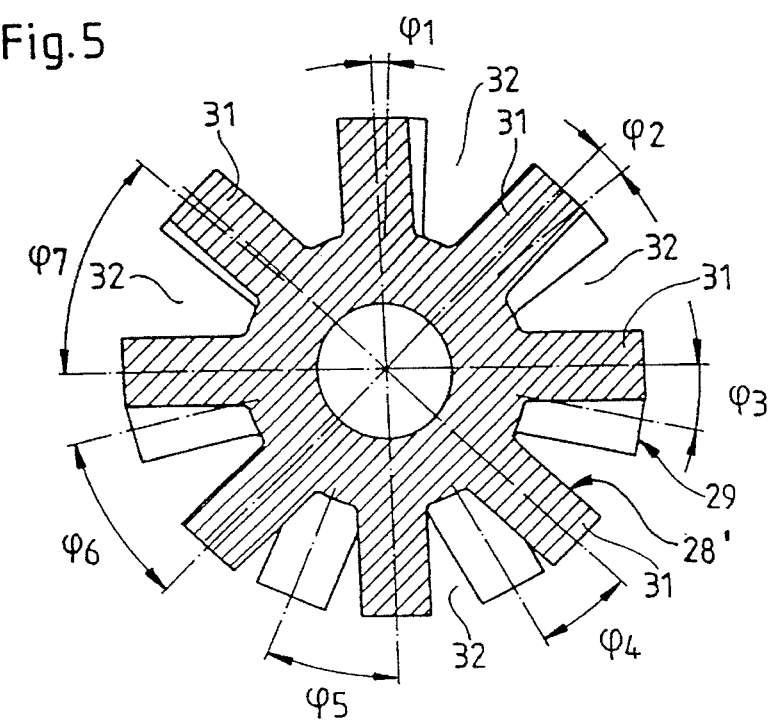

APPARATUS FOR CONTINUOUS FLUIDIZED BED AGGLOMERATION

BACKGROUND OF THE INVENTION

The invention relates to a process for the continuous fluidised bed agglomeration of a solid in powder form, which is sprayed together with a granulating liquid into a fluidised bed operated with fluidising gas, and in which the finished granular material is discharged out of the fluidised bed through a gas classifier.

To this end, the powder to be agglomerated is placed in the apparatus and transferred to the fluidised bed state by means of the fluidising gas. The fluidised powder is sprayed with the granulating liquid and thus brought to a sticky state with the result that granular product formation commences. If the grains of granular material have the desired size, drying generally takes place in the same apparatus with the liquid supply switched off.

In view of the constantly changing particle size of the powder until the finished granular material, the fluidising behaviour of the solid is subject to constant change, smaller particles in the fluidised bed requiring a lower fluidising velocity than large particles. For this reason, the fluidising velocity is usually adjusted to the particle size. A fluidising velocity that is too high leads to a discharge of product out of the bed; a fluidising velocity that is too low allows the bed to "collapse".

DESCRIPTION OF RELATED ART

Apart from plants for a batchwise mode of operation, those plants for continuous use are also known. As a rule, they have a long-stretched-out design with individual zones through which the product passes until it is discharged. With said design, powder intake and granular material discharge lie far apart from each other, as a result of which the recycling of grains of granular material that have not yet reached the desired particle size is made more difficult. A systematic, homogeneous, skin-like granular material structure is hardly possible with said apparatus, since an excess of powder is initially present in the fluidised bed. Methods and apparatus for fluidised bed granulation are described, e.g., in Chem. Ing. Tech. 45, page 736–739 (1973), DE 2 231 445, DE 2 555 917, EP 87 039 and EP 163 836.

A grain of granular material with constant and reproducibly adjustable physical properties (particularly particle size and mechanical strength) can be produced only if constant process-related granulation conditions can be adhered to in the fluidised bed apparatus.

Constant granulation conditions are present if the fluidised bed content is kept constant, with the result that, in the stationary state, the solids mass fed into the fluidised bed is equal to the mass of the finished granular materials removed from the bed.

SUMMARY OF THE INVENTION

The invention begins here. The object was, starting from a starting product in powder form, continuously to prepare spherical granular materials, if possible, with a narrow particle size distribution, by means of fluidised bed granulation. In so doing, the granulation process should always take place under constant and reproducibly adjustable granulation conditions, in order to guarantee a constant product quality in terms of the size and mechanical properties of the granular material.

Said object according to the invention is achieved, starting from the process described at the beginning, in that the granulating liquid together with propellant air is supplied centrally through a three-substance nozzle on the distributor of the fluidised bed, and at the same time the solid in powder form is fed into the fluidised bed through the annular space of the three-product nozzle by means of a current of propellant air supplied separately and concentrically, with the result that a three-phase mixture of solid, granulating liquid and propellant air is produced in the centre of the fluidised bed. Advantageously, the finished granular material is discharged out of the fluidised bed centrally through an intake weir arranged concentrically to the three-substance nozzle on the gas classifier.

According to a further development of the invention, the solids content of the fluidised bed is kept constant by a control loop, in which the pressure drop of the fluidizing air in the fluidised bed is used as measured variable and the mass flow of classifying air in the gas classifier is used as correcting variable. As an alternative to adjusting the mass flow of classifying air, the intake cross-section of the intake weir on the gas classifier may also be adjusted.

Another variant consists in the fact that a part of the solid to be granulated is already added in the finely divided form to the granulating liquid. A suspension of solid and liquid is, therefore, used as granulating liquid.

The fines proportions produced in the fluidised bed are expediently separated by means of an external dust filter and recycled to the fluidised bed via the solids-propellant air stream.

A further improvement consists in the fact that the product moisture content in the fluidised bed is measured and regulated constantly by adjusting the quantity of granulating liquid or suspension metered into the fluidised bed.

The device for carrying out the process comprises a fluidised bed granulator with a distributor and a nozzle for spraying the fluidised solid with the granulating liquid, and feed lines for the solid and the granulating liquid and a gas classifier for the classifying discharge of the finished granular material. According to the invention, a three-substance nozzle for spraying a three-phase mixture of solid, granulating liquid and propellant air is arranged axially in the centre of the fluidised bed granulator. In addition, a mixing pipe, adjustable in height, is attached advantageously above the spray nozzle.

According to a further development, provision is made for the inlet cross-section of the intake weight on the gas classifier to be adjustable by means of a shutter composed of a rotatable sector lamellar disc.

Starting from a solid in powder form, the invention allows the continuous preparation of a virtually spherical granular material with a narrow particle size distribution under constant and reproducible operating conditions, in which the same particle size distribution in the statistical mean is always present in the fluid bed. Another advantage lies in the uniform, skin-like granular material structure, which is attributable essentially to the quantity of granulating liquid and powder mass added in a matched quantity ratio. Reference is also made to the detailed description below for further additional advantages.

The invention is described in more detail below on the basis of examples of execution and drawings.

BRIEF DESCRIPTION OF THE DRAWINGS

FIG. 3 A cross-section through the adjustable intake weir on the gas classifier

FIG. 4 A top view onto an intake weir with jointly adjustable entrance ports, and FIG. 5 A top view onto an inlet weir with individual adjustment of the entrance ports.

DESCRIPTION

Figure 1:
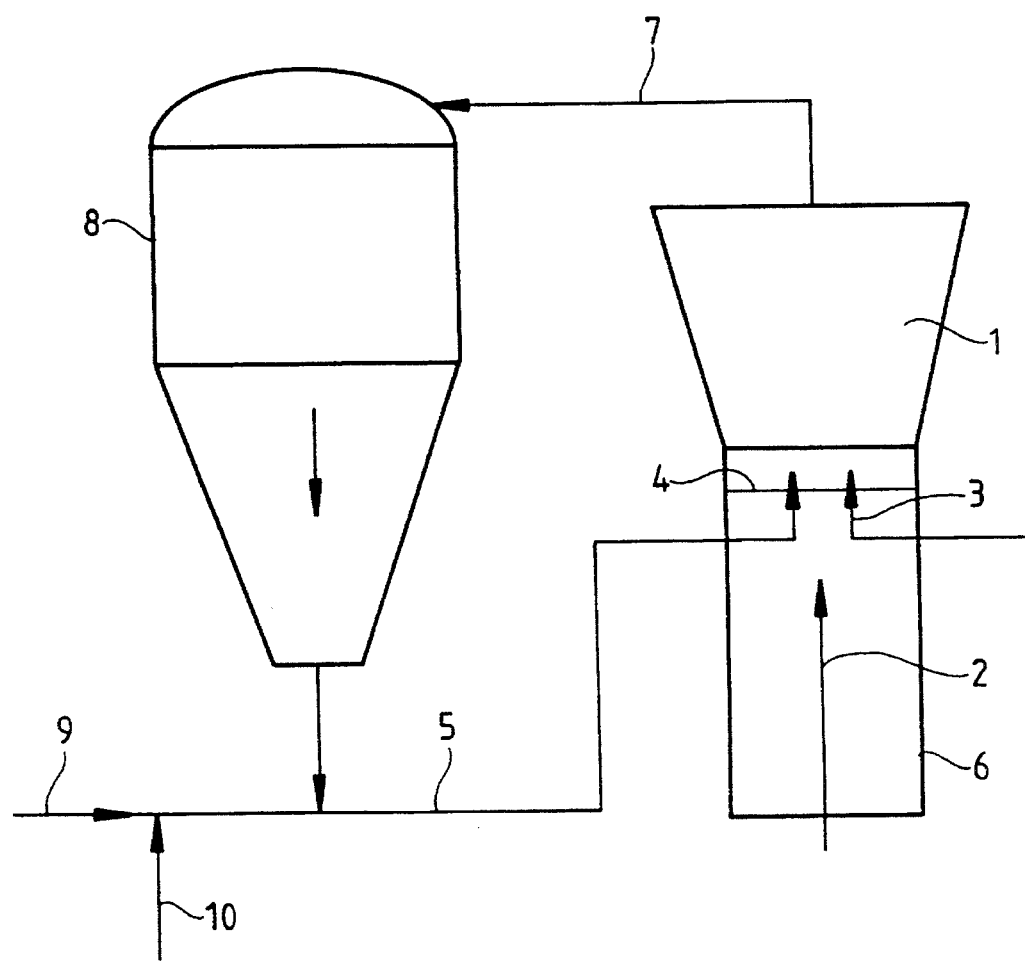
FIG. 1 A process diagram for the fundamental explanation of powder fluidised bed granulation FIG. 2 A process diagram to represent the control concepts applied in powder fluidised bed agglomeration and to explain the formation of granular material.

The principle of the process of fluidised bed agglomeration is shown in FIG. 1. Fluidising air 2, granulating liquid 3 and the solid in powder form 4 to be agglomerated are supplied continuously from below to the fluidised bed apparatus (WSG apparatus) 1. The finished granular material classified by means of a gas classifier (not shown in FIG. 1) falls into a product bunker 6. The streams of classifying air, propellant air and fluidising air fed in leave the WSG apparatus 1 via the exhaust air line 7. The entrained dust is separated in an external dust filter 8 and recycled through the pneumatic delivery line 5 to the WSG apparatus 1. The propellant air for the pneumatic delivery line 5 is supplied via the connecting piece 9 and the solid to be agglomerated via the connection 10.

Figure 2:
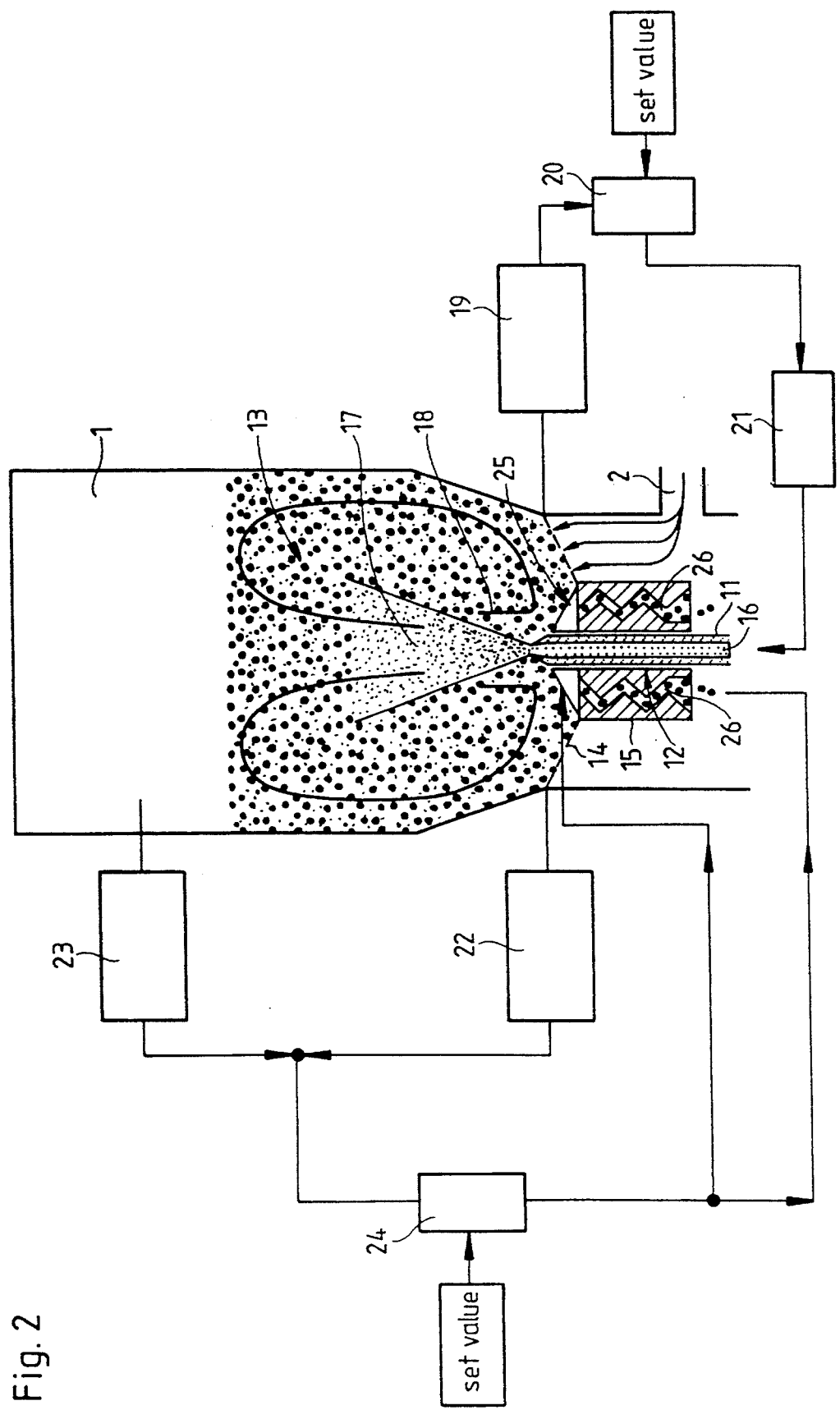

The solid is fed into the fluidised bed 13 via the cladding tube 11 of a three-substance nozzle 12 arranged centrally in the WSG apparatus 1 (see FIG. 2). The fluidising air 2 is supplied in the distributor (14) of the WSG apparatus 1. On the base of the fluidised bed apparatus 1 is arranged, likewise centrally and concentrically to the three-substance nozzle 12, a gas classifier 15 on the classifying discharge of the granular material.

Propelled by air, the solid in powder form is blown through the pneumatic delivery line into the annular space of the three-substance nozzle. The granulating liquid 3 is sprayed into the WSG apparatus through the inner pipe 16, likewise by means of propellant air. A spray cone 17 composed of the three-phase mixture of powder-liquid-air is thereby produced at the nozzle head. In the course of time, the granular material growing continuously in the fluidised bed 13 arrives repeatedly via an intake weir (see FIG. 3 to FIG. 5) in the gas classifier 15 where the fines portion is separated and recycled to the WSG apparatus 1. The particles that have already reached the desired size (desired particle size) fall into the product bunker 6, whilst the granular material that is still immature and too fine is entrained by the stream of classifying air and carried back into the fluid bed 13. The central arrangement of the powder and liquid addition on the one hand, and of the gas classifier on the other, allow zones of a different moisture content to be set up in the fluid bed 13. Agglomeration itself takes place in the centre of the fluid bed 13, which is promoted by the high moisture content in view of the liquid feed. Additionally, the impulse of the streams of propellant air fed in, as shown in FIG. 2, brings about a circulatory movement of the fluid bed. Before the granular materials reach the gas classifier 15, they must cross the distributor 14 and there come into intensive contact with the hot and dry fluidising air. The fact that only dry granular material falls through the gas classifier 15 is thereby guaranteed. In this way, a product residual moisture content of less than 8% is obtained without additional drying.

In view of the concentric arrangement of the gas classifier 15 with the associated intake weir 25 described further below on the base of the WSG apparatus 1, rotationally symmetrical particle circulations are achieved for the grains of granular material situated in fluid bed 13. The probability of grading or classifying is thus equally high for all the particles. A second important aspect is the loop-like motion mentioned of the grains of granular material in the fluid bed 13. After being wetted by the granulating liquid 3, the grains of granular material rise upwards, initially, then travel in the direction of the outside wall of the WSG apparatus 1, finally sink back down on the wall and then arrive via the distributor 14 in the catchment area of the gas classifier 15. In this way, a maximum circulation path between wetting and classifying is produced. Before the granular material reaches the gas classifier 15, it passes the zone of greatest drying above the distributor 14.

Above the head of the three-substance nozzle 12, a mixing pipe 18 extending in an axial direction is arranged centrally, the height of which above the distributor 14 can be adjusted. As a result of the mixing pipe 18, the zone of high moisture content is concentrated even more strongly on the central region of the fluid bed 13. As a result, the wetted particles receive an even greater adhesive power and are thus in a better position to unite with the powder fed in in this region. This leads to a reduction in the integral moisture content in the fluidised bed 13.

The plant described permits the continuous agglomeration of solids in powder form under constant operating conditions. If, however, more stringent requirements are made in respect of the physical product properties, it is necessary to take control measures in addition, in order to guarantee a stable mode of operation over the long term. It was found that said requirements can be met if the particle moisture content and the temperature in the fluid bed and the fluidised bed content (bed height) are kept constant within certain limits. Only if there is a sufficient moisture content will agglomeration take place. Temperature control of the fluidised bed is required so that the granulating liquid may be removed by drying after fulfilling its task as a binder. A rising bed content leads not only to a greater pressure drop in the fluidised bed and therefore to an increase in the required admission pressures of the fluidising air and the classifying air, but also to an altered residence time behaviour for the particles. As a result of the longer circulation path, the granular materials no longer undergo the classifying process so frequently, as a result of which the separation of desired size product and undersize product is impaired. For these reasons, a fully automatic control was developed in order to keep constant the parameters moisture content, bed content and bed temperature. The control loops required for this purpose are explained on the basis of FIG. 2. The moisture content in the fluidised bed is measured with an infrared moisture sensor 19. The measured moisture value is compared with a predetermined desired value by means of a separate controller 20, and the metering pump 21 for the granulating liquid is adjusted in such a way that the difference between the measured moisture value and the predetermined desired value is minimised. In this way, the moisture content in the fluidised bed can be kept constant within a narrow range. Too dry a mode of operation would impede the agglomeration of the particles, since in this case the mutual adhesive forces resulting from the liquid bridges would not be sufficient. On the other hand, an increase in the moisture content in the bed would increase the inter-particulate adhesive forces and thus impede the movement of the individual particles. If the moisture content is too great, the fluidised bed eventually collapses because of excessive wetting (formation of a pasty mass).

If the granulating liquid is metered into the fluidised bed as pure liquid, wetting of the particles is required initially until the adhesive forces mentioned become effective due to bridge formation. If, however, a suspension of the solid to be granulated and the liquid is used from the outset as granulating liquid, partially wetted particles with an improved agglomerating capacity are already present. Said particles then meet larger grains of granular material to which they adhere spontaneously. At the same time, they are capable, because of the sticky surface, to unite with other powder particles. It has emerged that the agglomeration process as a whole is promoted by use of a solids suspension instead of a solids-free granulating liquid, with the result that the integral moisture content in the fluidised bed can be reduced. Drying is thus facilitated and the energy costs reduced. In order to produce the solids suspension, a part of the solid 4 in powder form is diverted and mixed with the granulating liquid 3.

If the height of the free-flowing product in the fluidised bed 13 alters (fluidised bed height), a change in the particle movement is also associated with this. With a view to obtaining a constant product quality, however, the aim should be a constant mode of operation, if possible, of all the parameters influencing the particle quality. For this reason, a further control loop is provided for, which ensures that a constant fluidised bed content and a constant fluidised bed height is kept. The measured variable used to determine the mass content of a fluidised bed is, in this case, the pressure drop of the gas in the free-flowing product, which is largely proportional to the fluidised bed mass. To this end, the differential pressure is measured by means of two pressure sensors 22 and 23 between a place on the base of the fluidised bed 13 and above the fluidised bed. The differential pressure signal is fed to a controller 24, which adjusts the mass flow of classifying gas required for the gas classifier 15 in such a way that the differential pressure remains constant and corresponds to a preset desired value. The mass flow of classifying gas is thus used as the correcting variable. An increase in the mass flow of classifying gas leads to an enlargement of the granular materials discharged. As the structure of the larger granular materials requires a longer residence time in the fluidised bed, however, this also leads to an increase in the fluidised bed height. Conversely, the outflow of granular material through the gas classifier 15 is increased by reducing the flow of classifying air. The controller 24 must contain an adjustable valve for adjusting the mass flow of classifying gas.

Alternatively, the inlet cross-section of the intake weir on the gas classifier 15 may also be used as correcting variable for control instead of the mass flow of classifying gas.

By way of the intake weir 25 arranged in a rotationally symmetrical manner and centrally on the base of the WSG apparatus 1, the grains of granular material arrive in the zigzag-shaped gas classifier channels 26. An intake weir with an adjustable, variable inlet cross-section is shown in FIG. 3 to FIG. 5. The intake weir 25 has a cone base-shaped shutter 27, which is connected to and flush with the three-substance nozzle 12 (see FIG. 2 and FIG. 3). According to FIG. 4, the shutter is composed of two superimposed, mutually rotatable sector lamellar discs 28 and 29. By rotating one sector disc, the inlet cross-section of the entrance ports 30 lying above the classifying channels 26 situated beneath it may be altered (corresponding to the angle of rotation $\emptyset$...). In the adjustment according to FIG. 2, the rotation of the sector lamellar disc is brought about with a servomotor.

With the intake weir according to FIG. 5, in contrast to the design according to FIG. 4, the individual lamellae 31 of the upper sector disc 28, may be rotated optionally with respect to the lower sector disc 29, with the result that the inlet cross-section of the entrance ports 32 (corresponding to the angles of rotation $\phi 1$, $\phi 2$, $\phi 3$ . . . ) may be adjusted individually. Said individual adjustment becomes useful if the gas classifier 15 is subdivided into several segment-shaped chambers which are assigned to the entrance ports 32. In this way, individual chambers may be closed, whilst the product to be classified is admitted optimally into the remaining chambers. With this mode of operation, therefore, the chambers are either closed or are operated under optimum conditions.

The choice of a suitable granulating liquid is made as a function of the solid to be granulated, according to the state of the art, from the point of view of the function of a binder between the particles to be agglomerated. The task of the granulating liquid consists initially in producing liquid bridges between individual solids particles. In view of the capillary negative pressure and surface tension of the liquid, the particles are held together in the moist state.

During the drying which follows the granulation process, said effect is then lost again. The following cases can be distinguished:

a. If the solid is soluble in the granulating liquid, the dissolved proportions will crystallise out during drying and replace the liquid bridge by a solids bridge which is usually harder.

b. If, on the other hand, the solid is insoluble in the granulating liquid, a soluble component must be added to the granulating liquid which then leads to a solids bridge (unrelated to the substance) during drying.

If the wetting properties of the solid and of the granulating liquid are insufficient, the case may occur that the still moist granular materials have a mechanical strength that is too low. The agglomeration process is thereby impaired, with the result that the formation of inadequately small grains of granular material frequently occurs. Remedy may be provided in such cases by high molecular weight binders which increase the adhesiveness of the granulating liquid.

The solid in powder form may contain, in addition to the product to be granulated, other components e.g., additional binders, such as, for example, starch or other water-soluble polymers.

We claim:

1. Apparatus for the continuous fluidised bed agglomeration of a solid in powder form, comprising a fluidised bed granulator with a gas distributor, a three-phase nozzle for spraying a solid in powder form to be agglomerated as one phase, a granulating liquid as a second phase, and propellant air as a third phase, and feed lines for supplying the solid, the granulating liquid and the propellant air to said three-phase nozzle, and a gas classifier at the bottom of said fluidised bed granulator for the classifying discharge of finished granular material, wherein said three-phase nozzle for spraying a three-phase mixture of solid, granulating liquid and propellant air is arranged axially in the bottom center of the fluidised bed granulator and said gas distributor is located concentrically to said three-phase nozzle.

2. Apparatus according to claim 1, wherein a mixing pipe, adjustable in height, is attached axially immediately above the three-phase nozzle.

3. Apparatus according to claim 1 wherein said gas classifier includes an intake weir which is adjusted by means of a shutter comprising a rotatable sector lamellar disc.

* * * * *